United States Patent [19]

Coran et al.

[11] 4,433,114
[45] Feb. 21, 1984

[54] DIENE RUBBER AND METHOD AND COMPOSITION FOR RUBBER TREATMENT

[75] Inventors: Aubert Y. Coran; Chester D. Trivette, Jr., both of Akron, Ohio

[73] Assignee: Monsanto Company, St. Louis, Mo.

[21] Appl. No.: 380,185

[22] Filed: May 20, 1982

Related U.S. Application Data

[63] Continuation-in-part of Ser. No. 322,142, Nov. 17, 1981, abandoned.

[51] Int. Cl.$^3$ .................... C08C 19/22; C08C 19/20
[52] U.S. Cl. .................... 525/332.6; 525/343; 525/332.7; 525/346; 525/347; 525/348; 525/349; 525/350; 525/351; 525/352; 525/377; 525/379
[58] Field of Search .............. 525/352, 346, 347, 348, 525/349, 343, 350, 379, 377, 351, 332.6, 332.7

[56] References Cited

U.S. PATENT DOCUMENTS

| | | | |
|---|---|---|---|
| 2,989,504 | 6/1961 | Little | 260/62 |
| 3,225,100 | 12/1965 | Mullins et al. | 260/577 |
| 3,297,713 | 1/1967 | Ladd | 260/326.3 |
| 3,502,542 | 3/1970 | Wenisch | 156/334 |

OTHER PUBLICATIONS

Chemical Abstracts, vol. 83, 1975, 61259b–Isoprene Rubber Compositions Having Good Green Strength.
Chemical Abstracts, vol. 85, 1976, 22603f–Improvement of the Green Strength of Polyisoprene.
J. Applied Polymer Science, vol. 8, pp. 2281–2298 (1964) "Vulcanization with Maleimides", P. O. Tawney, W. J. Wenisch, S. Van Der Burg, and D. I. Relyea.
Chemical Abstacts, vol. 81, 1974, 4619d–Diene Rubber Compositions with Improved Green Strength.
Chemical Abstracts, vol. 83, 1975, 29568r–Modifying Polyisoprene Rubbers.

*Primary Examiner*—C. A. Henderson
*Attorney, Agent, or Firm*—Gordon B. Seward

[57] ABSTRACT

Improved tack, green strength or non-black filler interaction capability are realized in a treated diene rubber. The method of treating diene rubber to achieve the improvements is shown, together with a composition in which maleamic acid or derivatives of maleamic acid are combined with sulfur or an organic sulfur compound capable of generating a thiyl radical.

62 Claims, No Drawings

DIENE RUBBER AND METHOD AND COMPOSITION FOR RUBBER TREATMENT

This Application is a continuation-in-part of Application Ser. No. 322,142, filed Nov. 17, 1981, and now abandoned.

BACKGROUND OF THE INVENTION

This invention relates to an improved diene rubber, to a method for treating diene rubber and to a treatment composition comprising maleamic acid or derivatives thereof combined with sulfur or an organic sulfur compound capable of generating a thiyl radical effective in improving the tack, green strength or non-black filler interaction capability of the diene rubber.

The introduction of synthetic diene rubber as a total or partial replacement for natural rubber in portions of pneumatic tires and other rubber articles presented problems in that the behavior of the synthetic materials differed from that of natural rubber. One significant area of difference concerned tack and green strength. Typically, unvulcanized synthetic diene rubber has significantly lower green strength and tack properties than does natural rubber. This difference has presented problems in that articles such as tires failed to maintain their structural integrity during handling and shaping prior to vulcanization. As a result, searching for improvements in the green strength and tack of rubber compounds containing synthetic rubber has been a continuing effort.

Synthetic polyisoprene has been produced which resembles natural rubber closely, consisting of essentially all cis-1,4-polyisoprene. Perhaps the most significant difference between synthetic polyisoprene and natural rubber is that the former has considerably less green strength and tack. Thus, much of the effort toward green strength and tack improvement concerns synthetic polyisoprene. Other synthetic diene rubbers which are widely used are polybutadiene and styrene-butadiene copolymer rubber (SBR).

Efforts to increase the tack and green strength of diene rubber include a variety of treatments such as the addition of a wide variety of resin tackifiers to synthetic rubber compounds. In general, these materials have been ineffective for the desired purpose, primarily because of the inherently lower green strength of the synthetic rubber polymers. U.S. Pat. Nos. 3,151,161 and 3,225,100 teach incorporation of nitrosoanilinoalkanes into rubber, and improvements in green strength have been realized in synthetic rubber thus treated. Problems of dispersion of these materials into rubber have been encountered, compounded by the fact that relatively small amounts are generally used.

Additionally, the use of non-black fillers in diene rubber compounds is limited because of the poorer physical properties of vulcanizates as compared to carbon black reinforced rubber. Little interaction appears to occur between non-black fillers and diene rubber, in most instances.

SUMMARY OF THE INVENTION

It is an object of this invention to provide a composition which comprises diene rubber having improved green strength, tack or non-black filler interaction. It is another object of this invention to provide a method of treating diene rubber so as to improve its green strength, tack or non-black filler interaction. It is yet another object to provide a treatment composition suitable for use in improving the properties of diene rubber.

These and other objects are realized in the instant invention by a composition of matter comprising diene rubber treated, in the presence of a modification promoting amount of (A) sulfur or an organic sulfur compound capable of generating thiyl radicals, by (B) a compound of the formula

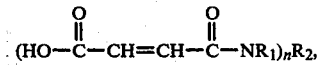

n being an integer of 1-3, wherein $R_1$ is hydrogen or alkyl of 1-10 carbon atoms and, if n=1, $R_2$ is selected from hydrogen, alkyl of 1-10 carbon atoms, optionally forming a heterocyclic moiety with the N atom of the formula and $R_1$, either with or without an added N or O atom,

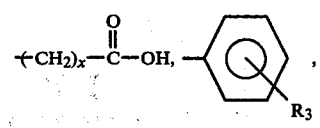

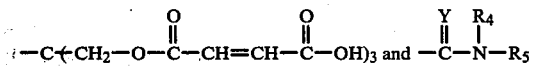

wherein Y is an oxygen or sulfur atom, x is an integer of 1-12, $R_3$ is hydrogen, —OH, —COOH, —NO$_2$, alkoxy of 1-5 carbon atoms or

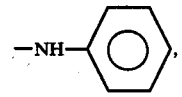

and $R_4$ and $R_5$ are the same or different selected from hydrogen, phenyl and alkyl of 1-10 carbon atoms, including cycloalkyl of from 3 to 10 carbon atoms, optionally forming a heterocyclic moiety together with one or both of the N atoms in the formula, with or without an added hetero N or O atom; if n=2, $R_2$ is selected from phenylene, divalent aliphatic hydrocarbon radicals of 2-20 carbon atoms and

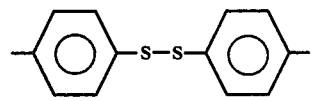

and if n=3, R is s-triazinyl or a trivalent aliphatic hydrocarbon radical of 2-20 carbon atoms, said composition having been treated at an appropriate temperature above 130° C. for a long enough time to impart to the composition improved green strength, tack or non-black filler interaction capability.

The instant invention also includes the method of treating diene rubber comprising treating the rubber, in the presence of a modification promoting amount of (A) sulfur or an organic sulfur compound capable of generating thiyl radicals, with (B) a compound of the formula as defined above, at an appropriate temperature above 130° C. for sufficient time to impart to the composition improved green strength, tack or non-black filler interaction capability.

Further, the invention includes a composition of matter comprising from 5 to 95 parts by weight of (A) sulfur or an organic sulfur compound capable of generating thiyl radicals and from 95 to 5 parts by weight of (B) a compound of the formula

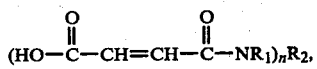

n being an integer of 1-3, wherein $R_1$ is hydrogen or alkyl of 1-10 carbon atoms and, if n=1, $R_2$ is selected from hydrogen, alkyl of 1-10 carbon atoms, optionally forming a heterocyclic moiety with the N atom of the formula and $R_1$, either with or without an added N or O atom,

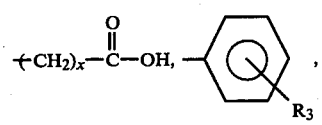

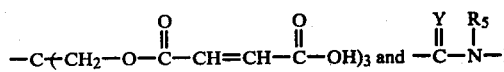

wherein Y is an oxygen or sulfur atom, x is an integer of 1-12, $R_3$ is hydrogen, —OH, —COOH, —$NO_2$, alkoxy of 1-5 carbon atoms or

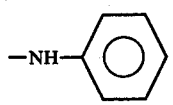

and $R_4$ and $R_5$ are the same or different selected from hydrogen, phenyl and alkyl of 1-10 carbon atoms, including cycloalkyl of from 3 to 10 carbon atoms, optionally forming a heterocyclic moiety together with one or both of the N atoms in the formula with or without an added hetero N or O atom; if n=2, $R_2$ is selected from phenylene, divalent aliphatic hydrocarbon radicals of 2-20 carbon atoms and

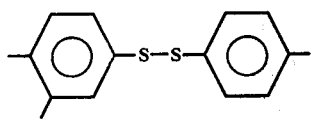

and if n=3, R is s-triazinyl or a trivalent aliphatic hydrocarbon radical of 2-20 carbon atoms.

The derivatives of maleamic acid which form component (B) as defined above include (in addition to maleamic acid, itself) alkyl amides, for example, N-methyl maleamic acid, N-ethyl maleamic acid, N-propyl maleamic acid, N-isopropyl maleamic acid, N-butyl maleamic acid, N-isobutyl maleamic acid, N-tert-butyl maleamic acid, N-pentyl maleamic acid and N-1,2-dimethylpropyl maleamic acid. N-substituted alkyl carboxy derivatives of maleamic acid are exemplified by N-carboxymethylmaleamic acid, N-carboxyethylmaleamic acid, N-carboxypropylmaleamic acid, N-carboxybutylmaleamic acid, N-carboxyamylmaleamic acid and N-carboxy hexylmaleamic acid and carboxy dodecyl maleamic acid. N-phenyl- and N-substituted-phenyl derivatives are exemplified by N-phenylmaleamic acid and the ortho, meta and para isomers of N-methoxyphenylmaleamic acid, N-ethoxyphenylmaleamic acid, N-propoxyphenylmaleamic acid, and the like, the ortho-, meta- and para-isomers of N-anilinophenylmaleamic acid, and the ortho-, meta- and para-isomers of phenylene-bis-maleamic acid.

Carbamoyl and substituted carbamoyl derivatives include N-carbamoylmaleamic acid (sometimes called maleuric acid) and the products of the reaction of one mole of maleic anhydride with one mole of 1,3-dimethylurea, ethylurea, phenylurea, and the like, and the product of the reaction of one mole of melamine with three moles of maleic anhydride. Thiocarbamoyl and substituted thiocarbamoyl derivatives include N-thiocarbamoylmaleamic acid and the products of the reaction of one mole of maleic anhydride with one mole of phenylthiourea, ethylthiourea and the like.

Bis-maleamic acid compounds include methylene-bis-maleamic acid, ethylene-bis-maleamic acid, trimethylene-bis-maleamic acid, tetramethylene-bis-maleamic acid, N,N'-bis-(4,4'-dithiophenyl)maleamic acid and phenylene-bis-maleamic acid.

Other maleamic acids include 4,4-dithio-bis-(N-phenyl-maleamic acid) and the reaction products of maleic anhydride with N-(1,3-dimethylbutyl)-N'-phenyl-p-phenylenediamine and with 2-imidazolidone.

While the compositions and methods of the invention are described as employing a compound (B) which is maleamic acid or a derivative thereof, if desired, two or more of the above listed compounds can be used to form the component (B).

Component (A) of the invention is defined as sulfur or an organic sulfur compound capable of generating a thiyl radical. The sulfur compound is preferably a polymeric sulfide or a compound of the formula $(R_6S_z)_yR_7$, wherein z is an integer of 1-5, y is an integer of from 1-4, $R_7$ is a radical selected from aliphatic hydrocarbon radicals of 3-18 carbon atoms optionally containing one or more ether or ester linkages and optionally substituted by one or more nitro, amino or carboxyl groups; cycloalkyl of 3-10 carbon atoms; benzyl or phenyl optionally ring-substituted by one or more nitro, amino, carboxyl, or 1-5 carbon-atom alkyl grops; or benzothiazyl; dialkylthiocarbamoyl; alkylamino of 4-12 carbon atoms; morpholino or dialkylthiophosphoroyl; $R_2$ having a valence of y; and $R_6$ is hydrogen or a radical selected from the same group as $R_7$.

Such sulfur compounds include, for example, thiokol polymers and phenyl disulfide, 4,4'-diaminophenyldisulfide, 4,4'-dinitrophenyldisulfide, 2,2'-diaminophenyldisulfide, 4,4'-dicarboxyphenyldisulfide, cyclohexyldisulfide, benzyldisulfide, the compound n—$C_8H_{17}$—$S_x$—$C_8H_{17}$—n, where x is an average of 3.5; N,N'-dimorpholinodisulfide, N-t-butyl-2-benzothiazyl sulfenamide, tetramethyl thiuram disulfide; mercaptans, such as n-decyl mercaptan, n-dodecyl mercaptan, phenyl mercaptan and 2-mercaptobenzothiazole; and compounds of the formula Acc—SS—R—SS—Acc, where Acc stands for an accelerator moiety such as benzothiazyl, dialkyldithio carbamoyl, and the like, and R is divalent hydrocarbon radical such as alkylene, p-phenylene, p-xylene and the like.

Examples of this latter variety of compounds are

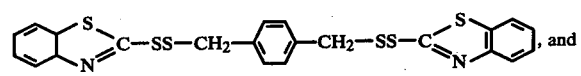, and

-continued

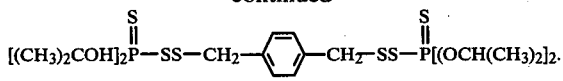

A preferred example of (A) is 2,2'-dithiobis-benzothiazole, sometimes known as benzothiazyldisulfide, or MBTS.

If sulfur is used as component (A) it can generally be used in lesser amounts than the organic sulfur compounds. The use of too much sulfur may actually reduce tack since appreciable vulcanization may occur during the treatment.

By diene rubber is meant an elastomer which is a polymer from diene monomer, either a natural or synthetic polymer, including mixtures of two or more of natural and synthetic polymers. Natural diene rubber includes Hevea rubber, in the form of smoked sheet, crepe or other typical forms, guayule, and other naturally occurring elastomers. Synthetic polymers which are included in the definition of "diene rubber" include polymers from isoprene and butadiene, either homopolymers or copolymers with one or more co-monomers, which can be dienes or other polymerizable materials. For example, copolymers of isoprene or butadiene with styrene, acrylonitrile, isobutylene, or unsaturated carboxy acids and esters such as maleic, fumaric, itaconic, acrylic and methacrylic acids, and methylmethacrylates are included. EPDM rubbers (polymers from ethylene, propylene and a non-conjugated diene monomer) are also included.

The invention finds a particular usefulness in use with synthetic polyisoprene of a high cis-1,4 content, and with blends thereof with polybutadiene or SBR (styrene/butadiene copolymer rubber).

Component (A) is to be used in reaction promoting amount. This amount can vary, depending on the diene rubber, the particular component (B) employed, the improvement desired and, especially, the nature of the particular component (A) used. In general, the amount is preferably from 0.01 to 15 parts, more preferably from 0.02 to 4 parts and most preferably from 0.05 to 2.5 parts by weight of component (A) per 100 parts by weight of diene rubber. If (A) is sulfur, less than 0.25 parts per 100 parts of treated rubber is preferred.

Component (B) can similarly be present in varying amount, but is preferably used at level of from 0.1 to 20 parts, more preferably from 0.2 to 8 parts and most preferably from 0.25 to 5 parts by weight per 100 parts by weight of diene rubber. The use of amounts of either components (A) or (B) which are less than the preferred lower limits can result in insufficient improvement in the desired properties of the diene rubber. Also, the use of amounts of the components in excess of the preferred under limits can be counter-productive. Optimum levels can be easily determined by a few simple experiments.

Treatment of the diene rubber means incorporating components (A) and (B) into the rubber, with good dispersion, and maintaining the mixture at the appropriate temperature (above 130° C.) for sufficient time to permit the modification to occur. Preferably the temperature should be at least 150°, more preferably above 160° and most preferably from 160° to 210° C. A convenient method of treating involves admixture of components (A) and (B) into the rubber using the type of high-shear equipment normally used for mixing rubber compounds, such as rubber mills, and, preferably, internal mixer exemplified by Banbury mixers and the like.

Such mixing produces a temperature rise in the rubber mixture which can be controlled within the desired temperature range. Alternatively, components (A) and (B) can be incorporated into the diene rubber at a relatively low temperature (below 130° C.) and then the mixture can be heated to the appropriate higher temperature and held for the required time.

Preferably, the treatment time will be from 0.1 to 20 minutes, more preferably from 0.5 to 15 minutes and most preferably from 1 to 10 minutes. Shorter treatment times than the preferred minimum can result in insufficient improvement in the desired properties, and longer treatment times than the preferred maximum can be harmful to the rubber. As with the levels of the components, both optimum times and optimum temperatures for a specific combination of ingredients can easily be determined by a limited number of experiments.

Other rubber compounding ingredients can optionally be present during the treatment, and the presence of carbon black and/or non-black fillers is preferred. Because of the conditions employed, however, the complete vulcanization system is preferably not present during the treatment, as it could result in a premature curing or scorch of the diene rubber compound. If it is desired to have non-black fillers present in the diene rubber compound, particular advantage is realized by having the fillers present during the treatment step. This method can produce interaction between the non-black filler and the diene rubber so as to obtain better physical properties in the vulcanized compounds. These better physical properties are evidenced in improvements in stress-strain properties among other properties.

Preferably, during the treatment step the presence of amines such as antidegradants should be avoided lest they react with component (B) before it can react with the rubber polymer. Such compounding ingredients and others which can react adversely with component (B) should be added after the treatment, either as a separate step or simply added after sufficient reaction time.

Often, when treating the diene rubber, amounts of components (A) and (B) will be substantially less than the maximum preferred levels set forth above, such as, for example, less than three parts by weight per 100 parts of diene rubber by weight, but higher amounts can be employed, especially if a "masterbatch" technique is used. This technique can involve treating only a portion of the diene rubber, then subsequently blending the untreated portion into the treated portion. From ten parts or less up to 1,000 parts or more additional rubber can be admixed to the treated rubber, as desired. The additional rubber can be the same as, or different from the rubber originally treated. The masterbatch technique can be effective in providing more efficient use of the masticating equipment, thus allowing higher throughput of rubber.

During the treatment step the appropriate amounts of components (A) and (B) are both present in the diene rubber. They can be added separately; however, it has been found to be convenient to add both components together as a mixture in the composition as set forth above. This mixture can be added to the rubber as a simple blend of components (A) and (B), however, alternatively, the rubber treatment composition of matter of the invention, if desired, can advantageously be incorporated into a binder or carrier material, thus forming an additive which is easier to handle and easier to use. Any such binder should, of course, be compatible not only with the composition of the invention, but also with the materials to be treated. According to the method of this invention those materials comprise diene rubber. Organic polymers are suitable binders, and polyolefins, especially polyethylene, are particularly effective. The composition is preferably blended into the binder, using such relative amounts as to achieve a final amount of from 5 to 95 weight percent of the composition of the invention based on the total weight of the mixture of binder and composition. Since the composition is used in relatively small proportions in diene rubber, its incorporation into a mixture with the binder facilitates dispersion of the composition into the diene rubber. Alternatively, the composition can be blended with an inert carrier material for improved dispersion. Clay, or a similar carrier is recommended for this purpose.

As mentioned above, the improvement of tack and green strength is of great practical importance. The nature of these two properties in uncured rubber compounds has been explored by a number of investigators. A review of recent developments was recently published, written by G. R. Hamed of the University of Akron, entitled "Tack and Green Strength of Elastomeric Materials", *Rubber Chemistry and Technology*, 54, pp. 576–595 (1981). This review brings out the basic fact that tack and green strength are interrelated. Tack has been defined as the ability of two materials to resist separation after bringing their surfaces into contact for a short time under a light pressure. Green strength in an elastomer is its resistance, before vulcanization, to deformation or fracture. Green strength can be determined independently, but tack is dependent to a certain degree on green strength.

In general, the compounds which constitute part (B) of the compositions of the invention can be produced by reacting maleic anhydride with ammonia or a primary or secondary amine or amide in an acidic medium, such as glacial acetic acid. The use of acid can be helpful to prevent addition across the double bond of the maleic anhydride molecule.

DETAILED DESCRIPTION

A more complete understanding of the invention may be realized by reference to the following examples, in which all parts are by weight, unless otherwise specified.

EXMAPLE I

N-carbamoyl maleamic acid, one of the preferred compounds for component (B) of the composition of the invention, is prepared as follows:

Into a three-neck flask having a three liter capacity are charged 500 g. (5.1 mole) maleic anhydride, 300 g. (4.99 mole) urea and 1,000 ml. glacial acetic acid. The flask is equipped with stirrer, heating mantle with thermostat, a thermometer and a condenser. The reaction mixture is stirred at 50° C. for 48 hours. The precipitate which forms is filtered, washed with 300 ml. acetone, and dried overnight at 60° C. The product of 606 g. of a white solid having a melting point of 164°–165° C. Calculated as N-carbamoyl maleamic acid, the yield was 76.6%.

In a similar manner, N-carboxymethyl maleamic acid is prepared by first charging 150.1 g. (2.0 moles) glycine together with 500 ml. glacial acetic acid into a two-liter, three-necked flask equipped with stirrer, heating mantle with thermostat, a thermometer and a condenser. Separately, 196.1 g. (2.0 moles) maleic anhydride and 500 ml. glacial acetic acid is combined, and stirred until a homogeneous mixture is obtained. This mixture is then charged dropwise to the flask, with agitation, over a one-hour period. The temperature is adjusted to 60° C. and the reaction mixture stirred for one hour. The flask is then left overnight, whereupon the precipitate which forms is filtered, washed with acetone as before and dried in a 65° C. oven over the weekend. The yield is 343 g. of a white solid having a melting point of 192°–193° C. The yield calculates to 99.1%.

Similarly, t-butylamine is reacted with an equimolar amount of maleic anhydride to produce 97% yield of N-t-butyl maleamic acid, a white crystalline material melting at 138°–142° C.

In the same manner, equimolar amounts of 3-aminopropionic acid and maleic anhydride are reacted to produce N-carboxyethylmaleamic acid (M.P. 150°–152° C.) in 68% yield.

In a similar manner, equimolar amounts of ethylurea react with maleic anhydride to produce a white crystalline powder (after recrystallization from ethyl acetate) identified as N-(ethylcarbamoyl)maleamic acid, melting at 125°–127° C.

Similarly, phenylthiourea is reacted with an equimolar amount of maleic anhydride giving a white solid, N-(phenylthiocarbamoyl)maleamic acid, melting at 200°–202° C.

Similarly, equimolar amounts of 2-imidazolidone and maleic anhydride react to produce a white powder melting at 154°–155° C., and identified as having the following formula:

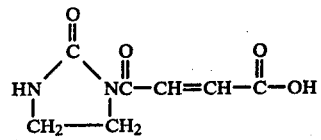

In a similar manner, 4-aminophenyl disulfide is reacted with twice its molar equivalent of maleic anhydride to produce N,N'-bis(4,4'-dithiophenyl)maleamic acid, melting (with some decomposition) at 195°–200° C.

Similarly, maleic anhydride is reacted in equimolar amounts with ammonia and with 4-amino butanoic acid to produce, respectively, maleamic acid (91% yield, M.P. 176°–177° C.) and N-carboxypropylmaleamic acid (84.5% yield, M.P. 164°–166° C.).

In the same manner, two moles of maleic anhydride are reacted with one mole each of hexamethylenediamine and dodecamethylene diamine to produce, respectively, N,N'-hexamethylenebismaleamic acid (95% yield, M.P. 175°–176° C.) and N,N'-dodecamethylenebismaleamic acid (90% yield, M.P. 164°–166° C.).

Similarly, equimolar amounts of p-carboxy aniline and maleic anhydride reacted to produce N-(p-carboxyphenyl)maleamic acid.

The compounds prepared in Example I are combined with 2,2'-dithiobisbenzothiazole in different weight ratios and the compositions thus formed are tested in rubber for their effect on the green strength and tack of the uncured rubber compounds. The various compositions are easily mixed to homogeneous powdery blends which are quite stable on storage.

The compositions thus made are mixed into rubber formulations and masticated according to the method of the invention; then the rubber compounds are tested according to the accepted tests for green strength and tack, as follows.

Green strength measurements are performed using a standard tensile testing machine. Samples of the stock to be tested are pressed into slabs approximately three millimeters in thickness, from which slab specimens are die-cut measuring about 20.3×2.4 cm. The specimens are bench marked (to a test length of 2.54 cm.) in the center, and the exact width and thickness is measured. Specimens are pulled at a crosshead speed of 50.8 cm. per minute, with the stress recorded at desired levels of elongation up to 1200%, or break. Stress values are calculated based on the original cross-section area of each specimen, and the maximum stress value is also recorded.

Tack measurements are made using the Monsanto Tel-Tak instrument, as described in an article by J. R. Beatty in *Rubber Chemistry and Technology*, 42, 1040 (1969). Fabric-backed rubber specimens are cut to a width of 6.35 mm and placed at right angles to give a contact area of 0.403 cm². A contact pressure of 227 grams is used for all tests, with a 30-second dwell time. Sample "stickiness" is measured by substituting a polished stainless steel surface for one specimen, and the result is subtracted from the tack value to give a "true tack" measurement. The units of these measurements are in grams per square centimeter, representing the maximum force per unit area required to separate the specimens, at a separation rate of 2.54 cm. per minute.

Stress-strain properties of the vulcanizates are measured in the conventional manner.

EXAMPLE II

The compounds prepared in Example I are combined with 2,2'-dithiobisbenzothiazole (MBTS) in the ratio of 2 to 1, so that the composition contains 33⅓% part (A) and 66⅔% part (B). Masterbatch compounds as shown in Table I based on Natsyn 2200, a synthetic polyisoprene rubber, are mixed and masticated in a laboratory Banbury mixer according to the following schedule:

1. Charge rubber and test compound; mix 1 minute, controlling temperature between 150° and 154° C.
2. Charge ½ of carbon black; mix 1 minute.
3. Charge oil and remainder of carbon black; mix 1 minute.
4. Charge remaining ingredients; mix 1 minute.
5. Sweep down; mix 1 minute.
6. Dump. Actual rubber temperature (using probe) should be 170°–200° C.

Masterbatch A is a control with no treating agent. Masterbatch B contains a known treating agent, N-(2-methyl-2-nitropropyl)-4-nitrosoaniline used at its recommended level.

TABLE I

|  | Masterbatch | | | |
|---|---|---|---|---|
|  | A | B | C | D |
| Polymer |  |  |  |  |
| Natsyn 2200 | 100.0 | → | → | → |
| Test Compounds |  |  |  |  |
| NITROL ® + Clay | — | 0.75 | — | — |
| N—Carbamoylmaleamic acid | — | — | 1.0 | — |
| N—Carboxymethylmaleamic acid | — | — | — | 1.0 |
| MBTS | — | — | 0.5 | 0.5 |
| Other Ingredients |  |  |  |  |
| N-330 Black | 50.0 | → | → | → |

TABLE I-continued

|  | Masterbatch | | | |
|---|---|---|---|---|
|  | A | B | C | D |
| Circosol 4240 Oil | 5.0 | → | → | → |
| Zinc Oxide | 5.0 | → | → | → |
| Stearic Acid | 2.0 | → | → | → |
| Antidegradant | 2.0 | → | → | → |
| Batch Dump Temp. (Probe) °C. | 188 | 183 | 182 | 188 |

*NITROL ® is a registered trade mark for 33% N—(2-methyl-2-nitropropyl)-4-nitrosoaniline on an inert carrier.

The masterbatches are then tested for green strength and tack, as set forth above. Results are shown in Table II following.

TABLE II

|  | Masterbatch | | | |
|---|---|---|---|---|
|  | A | B | C | D |
| Green Strength @ Room Temp. (MPa) Stress At: |  |  |  |  |
| 100% | 0.26 | 0.31 | 0.43 | 0.37 |
| 300% | 0.19 | 0.40 | 1.25 | 1.02 |
| 400% | 0.18 | 0.54 | 1.98 | 1.75 |
| U.E., %* | >1200 | 620 | 450 | 450 |
| Tack, Monsanto Tel-Tak |  |  |  |  |
| Tack | 44 | 66 | 121 | 114 |
| Stickiness | 11 | 12 | 12 | 13 |
| "True" Tack | 33 | 54 | 109 | 101 |

*Ultimate Elongation

The data in Table II show that the additives in Masterbatches C and D give significantly better improvements in both green strength and tack than the known material. The control sample shows a drop-off of green stress with increased elongation, whereas all the treating materials reverse this trend.

EXAMPLE III

To determine the effect of curatives on the green strength and tack of the masterbatches of Example II, sulfur and accelerator are added to each on a mixing mill, and the properties are again measured. Results are set forth in Table III, following.

TABLE III

|  | Stocks | | | |
|---|---|---|---|---|
|  | 1 | 2 | 3 | 4 |
| Ingredients |  |  |  |  |
| Masterbatch A | 164.0 |  |  |  |
| Masterbatch B |  | 164.75 |  |  |
| Masterbatch C |  |  | 165.5 |  |
| Masterbatch D |  |  |  | 165.5 |
| Sulfur | 2.5 | → | → | → |
| Accelerator | 0.5 | → | → | → |
| Test Compound, (phr in masterbatch) | — | 0.75 | 1.0 | 1.0 |
| MBTS (phr in masterbatch) | — | — | 0.5 | 0.5 |
| Green Strength @ Room Temp. (MPa) Stress At: |  |  |  |  |
| 100% | 0.23 | 0.33 | 0.32 | 0.34 |
| 300% | 0.16 | 0.69 | 0.72 | 0.75 |
| 400% | 0.14 | 1.16 | 1.16 | 1.30 |
| U.E., % | 950 | 560 | 520 | 530 |
| Tack, Monsanto Tel-Tak |  |  |  |  |
| Tack | 36 | 48 | 74 | 65 |
| Stickiness | 15 | 14 | 18 | 16 |
| "True" Tack | 21 | 34 | 56 | 59 |

The data in Table III indicate that, generally, both green strength and tack are lowered by adding curatives. The compounds of the invention, in Stocks 3 and 4, still show significantly better properties than the controls.

EXAMPLE IV

In a manner similar to Example II a series of masterbatches is prepared based, in this instance, on SKI-3 polyisoprene rubber (USSR). The treatment compositions are varied, both in the ratio of the components and in the total amount used. The mixing schedule used is the same as that in Example II. Proportions and data are set forth in Table IV.

Analysis of the data in Table IV indicates that, at low levels of treatment, such as 0.6 phr (parts per hundred of rubber) in masterbatches G and L, the effect on green strength is minimal, yet tack is significantly better than the control.

The green strength and tack values for masterbatch O show that, for this particular composition, a relatively high (about 91 to 9) ratio of maleamic acid derivative to MBTS is very effective.

level of treating composition and blending with additional diene rubber.

In a manner similar to that of Example II, masterbatches Q and R were prepared and masticated. The following recipes were used:

| Material | Parts by Weight Q | R |
|---|---|---|
| Natsyn 2200 Polyisoprene | 100.0 | — |
| Natural Rubber (SMR 5-CV) | — | 100.0 |
| N-330 Carbon Black | 15.0 | 50.0 |
| N—carbamoylmaleamic acid | 8.5 | 8.5 |
| MBTS | 1.5 | 1.5 |
| Circosol 4240 Oil | — | 5.0 |
| Zinc Oxide | — | 5.0 |
| Stearic Acid | — | 2.0 |
| Antidegradant | — | 2.0 |
| TOTAL | 125.0 | 174.0 |

Masterbatches Q and R were then mixed with addi-

TABLE IV

| | Masterbatch | | | | | | | | | | | |
|---|---|---|---|---|---|---|---|---|---|---|---|---|
| | E | F | G | H | I | J | K | L | M | N | O | P |
| Polymer, Test Compounds | | | | | | | | | | | | |
| SKI-3 Polyisoprene | 100.0 | → | → | → | → | → | → | → | → | → | → | → |
| NITROL + Clay | — | 0.75 | — | — | — | — | — | — | — | — | — | — |
| N—carbamoylmaleamic acid | — | — | 0.5 | 0.5 | 0.75 | 1.0 | 1.0 | — | — | — | — | — |
| N—carboxymethylmaleamic acid | — | — | — | — | — | — | — | 0.5 | 0.5 | 0.75 | 1.0 | 1.0 |
| MBTS | — | — | 0.1 | 0.5 | 0.3 | 0.1 | 0.5 | 0.1 | 0.5 | 0.3 | 0.1 | 0.5 |
| Other Ingredients | | | | | | | | | | | | |
| N-330 Black | 50.0 | → | → | → | → | → | → | → | → | → | → | → |
| Circosol 4240 Oil | 5.0 | → | → | → | → | → | → | → | → | → | → | → |
| Zinc Oxide | 5.0 | → | → | → | → | → | → | → | → | → | → | → |
| Stearic Acid | 2.0 | → | → | → | → | → | → | → | → | → | → | → |
| Antidegradant | 2.0 | → | → | → | → | → | → | → | → | → | → | → |
| Masterbatch Temp. at Dump, °C. | 188 | 185 | 191 | 185 | 185 | 187 | 188 | 185 | 185 | 185 | 188 | 191 |
| Green Strength @ Room Temp. (MPa) Stress At: | | | | | | | | | | | | |
| 100% | 0.23 | 0.24 | 0.25 | 0.25 | 0.26 | 0.27 | 0.30 | 0.26 | 0.26 | 0.26 | 0.30 | 0.33 |
| 300% | 0.17 | 0.30 | 0.21 | 0.30 | 0.35 | 0.25 | 0.70 | 0.23 | 0.33 | 0.42 | 0.43 | 0.79 |
| 400% | 0.15 | 0.43 | 0.23 | 0.40 | 0.52 | 0.29 | 1.27 | 0.23 | 0.45 | 0.66 | 0.68 | 1.39 |
| U.E., % | >1200 | 610 | 970 | 730 | 610 | 800 | 480 | 970 | 650 | 600 | 590 | 480 |
| Tack, Monsanto Tel-Tak | | | | | | | | | | | | |
| Tack | 42 | 69 | 51 | 69 | 73 | 50 | 113 | 49 | 74 | 74 | 88 | 40 |
| Stickiness | 24 | 25 | 30 | 31 | 22 | 23 | 21 | 16 | 28 | 18 | 16 | 17 |
| "True" Tack | 18 | 44 | 21 | 38 | 51 | 27 | 92 | 33 | 46 | 56 | 72 | 23 |

EXAMPLE V

This example shows the operation of the masterbatch technique, treating a portion of diene rubber with a high level of treating composition and blending with additional natural or synthetic polyisoprene rubber and other compounding ingredients, and the mixtures were tested for green strength and tack as before. Proportions and test results are set forth in Table V.

TABLE V

| | Mixtures | | | | | |
|---|---|---|---|---|---|---|
| | 5 | 6 | 7 | 8 | 9 | 10 |
| Additions | | | | | | |
| Natsyn 2200 Polyisoprene | 100.0 | 90.0 | 90.0 | — | — | — |
| Natural Rubber (SMR-5 CV) | — | — | — | 100.0 | 90.0 | 90.0 |
| N-330 Carbon Black | 50.0 | → | → | → | → | → |
| Circosol 4240 Oil | 5.0 | → | → | → | → | → |
| Masterbatch Q | — | 12.5 | — | — | 12.5 | — |
| Masterbatch R | — | — | 17.4 | — | — | 17.4 |
| Zinc Oxide | 5.0 | → | → | → | → | → |
| Stearic Acid | 2.0 | → | → | → | → | → |
| Antidegradant | 2.0 | → | → | → | → | → |
| Green Strength at Room Temp., Mpa Stress At: | | | | | | |
| 100% | 0.29 | 0.41 | 0.40 | 0.46 | 0.45 | 0.50 |
| 300% | 0.26 | 0.37 | 0.40 | 0.63 | 0.83 | 1.03 |
| 400% | 0.27 | 0.43 | 0.45 | 0.94 | 1.33 | 1.61 |
| U.E., % | >1200 | 830 | 840 | 590 | 540 | 510 |

TABLE V-continued

|  | Mixtures | | | | | |
|---|---|---|---|---|---|---|
|  | 5 | 6 | 7 | 8 | 9 | 10 |
| Tack, Monsanto Tel-Tak | | | | | | |
| Tack | 56 | 72 | 72 | 90 | 90 | 99 |
| Stickiness | 13 | 15 | 13 | 13 | 11 | 12 |
| "True" Tack | 43 | 57 | 59 | 77 | 79 | 87 |

The data in Table V show that the treatment of a relatively small amount of rubber with a relatively high level of treating composition produces a masterbatch which can then be blended with additional rubber to impart improved green strength and tack thereto.

Masterbatches Q and R are treated with 10 parts by weight of the treating compound, per 100 parts of synthetic polyisoprene and natural rubber, respectively. The masterbatches are then added to additional rubber at a ratio of one part masterbatch to nine parts rubber (based on the rubber content).

The test data show that the green strength and tack of both synthetic polyisoprene and natural rubber were improved by addition of the masterbatch. The natural rubber tack was only marginally increased, but substantial green strength improvements were achieved in all mixtures.

EXAMPLE VI

In order to evaluate several compounds for their effectiveness as component (A) of the composition of the invention, a series of masterbatches was run. N-carbamoylmaleamic acid was used as component (B), and MBTS, diphenyldisulfide, and 4,4'-dinitrodiphenyldisulfide as component (A). The masterbatches were compounded as shown in Table VI and were mixed and masticated in the same manner as in Example II. The results of green strength and tack tests are also shown in Table VI.

TABLE VI

| Masterbatch | S | T | U | V | W |
|---|---|---|---|---|---|
| Polymer | | | | | |
| Natsyn 2200 | 100.0 | → | → | → | → |
| Test Compounds | | | | | |
| NITROL + Clay | — | 0.75 | — | — | — |
| N—carbamoylmaleamic acid | — | — | 1.0 | 1.0 | 1.0 |
| MBTS | — | — | 0.5 | — | — |
| Diphenyldisulfide | — | — | — | 0.5 | — |
| 4,4'-dinitrodiphenyldisulfide | — | — | — | — | 0.5 |
| Other Ingredients | | | | | |
| N-330 Black | 50.0 | → | → | → | → |
| Circosol 4240 Oil | 5.0 | → | → | → | → |
| Zinc Oxide | 5.0 | → | → | → | → |
| Stearic Acid | 2.0 | → | → | → | → |
| Antidegradant | 2.0 | → | → | → | → |
| Green Strength @ R.T., MPa | | | | | |
| Stress At: | | | | | |
| 100% | 0.30 | 0.37 | 0.42 | 0.35 | 0.33 |
| 300% | 0.19 | 0.48 | 0.81 | 0.40 | 0.54 |
| 400% | 0.17 | 0.64 | 1.34 | 0.58 | 0.80 |
| U.E., % | >1200 | 610 | 490 | 690 | 590 |
| Tack, Monsanto Tel-Tak | | | | | |
| Tack | 50 | 80 | 93 | 69 | 82 |
| Stickiness | 14 | 15 | 16 | 14 | 15 |
| "True" Tack | 36 | 65 | 77 | 55 | 67 |

The test data in Table VI show that both diphenyl disulfide and 4,4'-dinitrodiphenyldisulfide are effective in the composition of the invention, but neither is as effective as MBTS.

EXAMPLE VII

A number of maleamic acid derivatives, together with maleamic acid itself are compared for their effect on the green strength and tack of synthetic polyisoprene, Natsyn 2200. MBTS was combined with each, in an amount of 0.15 parts compared with 0.85 parts of maleamic acid or derivative, based on 100 parts of rubber by weight.

Each masterbatch contained the following additional ingredients, expressed as parts by weight per 100 parts of rubber:

| N-330 Carbon Black | 50.0 |
|---|---|
| Circosol 4240 Oil | 5.0 |
| Zinc Oxide | 5.0 |
| Stearic Acid | 2.0 |
| Antidegradant | 2.0 |

The ingredients in each masterbatch were added and masticated in the same manner as in Example II, as shown in Table VII. Test data on green strength and tack are also set forth.

TABLE VII

| | X | Y | Z | AA | AB | AC | AD | AE | AF | AG |
|---|---|---|---|---|---|---|---|---|---|---|
| Test Ingredient | | | | | | | | | | |
| N—carbamoylmaleamic Acid | — | 0.85 | | | | | | | | |
| N—Carboxyethylmaleamic Acid | — | — | 0.85 | | | | | | | |
| N—t-Butylmaleamic Acid | — | — | — | 0.85 | | | | | | |
| N—Cyclohexylmaleamic Acid | — | — | — | — | 0.85 | | | | | |
| N—phenylmaleamic Acid | — | — | — | — | — | 0.85 | | | | |
| Maleamic Acid | — | — | — | — | — | — | 0.85 | | | |
| N—4-Carboxyphenylmaleamic Acid | — | — | — | — | — | — | — | 0.85 | | |
| N,N'—hexamethylene-bis-maleamic Acid | — | — | — | — | — | — | — | — | 0.85 | |
| N—4-diphenylaminomaleamic Acid | — | — | — | — | — | — | — | — | — | 0.85 |
| MBTS | — | 0.15 | → | → | → | → | → | → | → | → |
| Masterbatch Temp. at Dump, °C. | 191 | 197 | 197 | 195 | 194 | 191 | 193 | 194 | 193 | 189 |
| Green Strength @ Room Temp., Mpa | | | | | | | | | | |
| Stress At: | | | | | | | | | | |
| 100% | 0.31 | 0.32 | 0.28 | 0.27 | 0.36 | 0.25 | 0.30 | 0.32 | 0.27 | 0.28 |

TABLE VII-continued

|  | X | Y | Z | AA | AB | AC | AD | AE | AF | AG |
|---|---|---|---|---|---|---|---|---|---|---|
| 300% | 0.27 | 0.50 | 0.31 | 0.23 | 0.19 | 0.20 | 0.32 | 0.48 | 0.29 | 0.21 |
| 400% | 0.23 | 0.78 | 0.39 | 0.23 | 0.19 | 0.19 | 0.39 | 0.69 | 0.33 | 0.21 |
| U.E., % | >1200 | 520 | 760 | 1100 | >1200 | 1180 | 730 | 540 | 760 | >1200 |
| Tack, Monsanto Tel-Tak | | | | | | | | | | |
| Tack | 34 | 89 | 67 | 48 | 46 | 43 | 89 | 88 | 57 | 52 |
| Stickiness | 18 | 16 | 20 | 28 | 25 | 34 | 8 | 31 | 18 | 20 |
| "True" Tack | 16 | 73 | 47 | 20 | 21 | 9 | 77 | 57 | 39 | 32 |

The data in Table VII show that the various derivatives of maleamic acid are effective, together with MBTS, in improving the green strength or tack or both of synthetic polyisoprene, as is maleamic acid itself.

EXAMPLE VIII

N-Carbamoylmaleamic acid and N,N'-(4,4'-dithiophenyl)bis-maleamic acid are compared, together with MBTS, for their effect on the green strength and tack of Natsyn 2200.

The ingredients, as set forth in Table VIII, are combined as in Example II. Data on green strength and tack are shown.

From the data in Table VIII, it is apparent that both masterbatches AK and AL, treated according to the method of the invention, give significant improvements in both the green strength and tack of Natsyn 2200. In fact, both exhibit better green strength and tack than either the masterbatch treated with the known agent (AI) or the masterbatch made from natural rubber (AH).

TABLE VIII

|  | AH | AI | AJ | AK | AL |
|---|---|---|---|---|---|
| Polymer | | | | | |
| Natural Rubber (SMR 5-CV) | 100.0 | — | — | — | — |
| Natsyn 2200 | — | 100.0 | → | → | → |
| Test Compounds | | | | | |
| NITROL + Clay | — | — | 0.75 | — | — |
| N—Carbamoylmaleamic Acid | — | — | — | 0.85 | — |
| N,N'—(4,4'-dithiophenyl)-bis-maleamic acid | — | — | — | — | 0.85 |
| MBTS | — | — | — | 0.15 | 0.15 |
| Other Ingredients | | | | | |
| N-330 Carbon Black | 50.0 | → | → | → | → |
| Circosol 4240 Oil | 5.0 | → | → | → | → |
| Zinc Oxide | 5.0 | → | → | → | → |
| Stearic Acid | 2.0 | → | → | → | → |
| Antidegradant | 2.0 | → | → | → | → |
| Green Strength @ Room Temp., MPa Stress At: | | | | | |
| 100% | 0.33 | 0.24 | 0.28 | 0.29 | 0.29 |
| 300% | 0.40 | 0.17 | 0.35 | 0.48 | 0.42 |
| 400% | 0.56 | 0.15 | 0.48 | 0.64 | 0.58 |
| U.E., % | 600 | >1200 | 560 | 520 | 580 |
| Tack, Monsanto Tel-Tak | | | | | |
| Tack | 50 | 43 | 64 | 88 | 77 |
| Stickiness | 11 | 12 | 14 | 17 | 24 |
| "True" Tack | 39 | 31 | 50 | 71 | 53 |

TABLE IX

|  | AM | AN | AO |
|---|---|---|---|
| Polymer | | | |
| Natsyn 2200 | 100 | → | → |
| Test Compounds | | | |
| N—Carbamoylmaleamic Acid | — | 0.85 | — |
| N—(Phenylthiocarbamoyl)maleamic Acid | — | — | 0.85 |
| MBTS | — | 0.15 | 0.15 |
| Other Ingredients | | | |
| N-330 Carbon Black | 50.0 | → | → |
| Circosol 4240 Oil | 5.0 | → | → |
| Zinc Oxide | 5.0 | → | → |
| Stearic Acid | 2.0 | → | → |
| Antidegradant | 2.0 | → | → |
| Green Strength @ Room Temp., MPa Stress At: | | | |
| 100% | 0.37 | 0.40 | 0.40 |
| 300% | 0.37 | 0.92 | 0.62 |
| 400% | 0.41 | 1.41 | 0.80 |
| U.E., % | 820 | 460 | 610 |
| Tack, Monsanto Tel-Tak | | | |
| Tack | 56 | 82 | 75 |
| Stickiness | 14 | 17 | 17 |
| "True" Tack | 42 | 65 | 58 |

EXAMPLE IX

The data in Table IX show that treatment with either N-carbamoylmaleamic acid and MBTS or N-(Phenylthiocarbamoyl)maleamic acid and MBTS produces significant increases in the green strength and tack of synthetic polyisoprene.

EXAMPLE X

Several compounds are compared as part (A) of the composition, together with N-carbamoylmaleamic acid. Formulations and test results are set forth in Table X. The treatment was performed as in Example II.

As shown in Table X, the various part (A) components are all effective, in combination with N-carbamoylmaleamic acid, to improve the green strength and tack of Natsyn 2200. Without N-carbamoylmaleamic acid (Masterbatches AU, AW, AY, BA) the treatment is ineffective. Best results are obtained using MBTS.

TABLE X

|  | AP | AQ | AR | AS | AT | AU | AV | AW | AX | AY | AZ | BA |
|---|---|---|---|---|---|---|---|---|---|---|---|---|
| Polymer | | | | | | | | | | | | |
| Natsyn 2200 | 100.0 | → | → | → | → | → | → | → | → | → | → | → |
| Test Compounds | | | | | | | | | | | | |
| N—Carbamoylmaleamic Acid | — | 1.0 | 0.8 | 0.8 | 0.8 | — | 0.8 | — | 0.8 | — | 0.8 | — |
| MBTS | — | — | — | 0.2 | — | — | — | — | — | — | — | — |
| Sulfur | — | — | — | — | 0.05 | 0.05 | — | — | — | — | — | — |
| n-C$_8$H$_{17}$S$_x$C$_8$H$_{17}$.n | — | — | — | — | — | — | 0.2 | 0.2 | — | — | — | — |
| Cyclohexyldisulfide | — | — | — | — | — | — | — | — | 0.2 | 0.2 | — | — |

TABLE X-continued

|  | AP | AQ | AR | AS | AT | AU | AV | AW | AX | AY | AZ | BA |
|---|---|---|---|---|---|---|---|---|---|---|---|---|
| Benzyldisulfide | — | — | — | — | — | — | — | — | — | — | 0.2 | 0.2 |
| Other Ingredients | | | | | | | | | | | | |
| N-330 Carbon Black | 50.0 | → | → | → | → | → | → | → | → | → | → | → |
| Circosol 4240 Oil | 5.0 | → | → | → | → | → | → | → | → | → | → | → |
| Zinc Oxide | 5.0 | → | → | → | → | → | → | → | → | → | → | → |
| Stearic Acid | 2.0 | → | → | → | → | → | → | → | → | → | → | → |
| Antidegradant | 2.0 | → | → | → | → | → | → | → | → | → | → | → |
| Green Strength @ Room Temp., MPa | | | | | | | | | | | | |
| Stress At: | | | | | | | | | | | | |
| 100% | 0.27 | 0.32 | 0.32 | 0.32 | 0.32 | 0.28 | 0.32 | 0.26 | 0.32 | 0.27 | 0.33 | 0.27 |
| 300% | 0.18 | 0.32 | 0.28 | 0.44 | 0.31 | 0.23 | 0.31 | 0.21 | 0.29 | 0.21 | 0.32 | 0.21 |
| 400% | 0.17 | 0.39 | 0.31 | 0.63 | 0.39 | 0.23 | 0.37 | 0.21 | 0.33 | 0.19 | 0.39 | 0.19 |
| U.E., % | >1200 | 730 | 840 | 550 | 730 | 1100 | 790 | >1200 | 810 | >1200 | 770 | >1200 |
| Tack, Monsanto Tel-Tak | | | | | | | | | | | | |
| Tack | 47 | 69 | 60 | 86 | 71 | 47 | 52 | 48 | 71 | 49 | 65 | 47 |
| Stickiness | 16 | 17 | 16 | 15 | 16 | 16 | 12 | 16 | 16 | 14 | 15 | 15 |
| "True" Tack | 31 | 52 | 44 | 71 | 55 | 31 | 40 | 32 | 55 | 35 | 50 | 32 |

EXAMPLE XI

In order to evaluate the effect of the treatment of the invention upon non-black filled rubber, several filler materials are incorporated into Natsyn 2200 polyisoprene. The fillers are clays, of various types, identified as follows. The NUCAP samples were included as recommended for their improved reinforcing properties.

| Designation | Type |
|---|---|
| NUCAP 100 | Mercapto-functional Clay 0.3 micron |
| NUCAP 290 | Mercapto-functional Clay 0.3 micron |
| POLYFIL DL | Water-washed Clay, 1.0 micron |
| POLYFIL HG-90 | Water-washed Clay, 0.3 micron |
| SUPREX CLAY | Air-floated Clay, 0.3 micron |
| PARAGON CLAY | Air-floated Clay, 1.3 micron |

The various clays are incorporated into masterbatches in the same manner as in Example II and tested for green strength and tack as shown in Table XI.

The data in Table XI indicate generally lower green strength for all masterbatches, as would be expected with clay fillers as compared with carbon black. The increase in green strength for those clay samples which contained the composition of the invention is substantial. Modest increases in tack are seen, except in the case of air-floated clays, which are significantly improved by the treatment.

TABLE XI

|  | Masterbatch | | | | | | | | | |
|---|---|---|---|---|---|---|---|---|---|---|
|  | BB | BC | BD | BE | BF | BG | BH | BI | BJ | BK |
| Polymer | | | | | | | | | | |
| Natsyn 2200 | 100 | → | → | → | → | → | → | → | → | → |
| Test Compounds | | | | | | | | | | |
| N—Carbamoylmaleamic Acid | — | — | — | 1.70 | — | 1.70 | — | 1.70 | — | 1.70 |
| MBTS | — | — | — | 0.30 | — | 0.30 | — | 0.30 | — | 0.30 |
| Other Ingredients | | | | | | | | | | |
| NUCAP 100 | 72.0 | — | — | — | — | — | — | — | — | — |
| NUCAP 290 | — | 72.0 | — | — | — | — | — | — | — | — |
| Polyfil DL | — | — | 72.0 | 72.0 | — | — | — | — | — | — |
| Polyfil HG-90 | — | — | — | — | 72.0 | 72.0 | — | — | — | — |
| Suprex Clay | — | — | — | — | — | — | 72.0 | 72.0 | — | — |
| Paragon Clay | — | — | — | — | — | — | — | — | 72.0 | 72.0 |
| Zinc Oxide | 5.0 | → | → | → | → | → | → | → | → | → |
| Stearic Acid | 2.0 | → | → | → | → | → | → | → | → | → |
| Antioxidant | 1.0 | → | → | → | → | → | → | → | → | → |
| Green Strength @ Room Temp., MPa | | | | | | | | | | |
| Stress At: | | | | | | | | | | |
| 100% | 0.17 | 0.16 | 0.15 | 0.28 | 0.12 | 0.17 | 0.15 | 0.23 | 0.12 | 0.19 |
| 300% | 0.09 | 0.08 | 0.07 | 0.56 | 0.06 | 0.23 | 0.08 | 0.45 | 0.04 | 0.30 |
| 400% | 0.08 | 0.07 | 0.06 | 0.74 | 0.05 | 0.28 | 0.07 | 0.61 | 0.03 | 0.41 |
| U.E., % | 690 | 600 | 890 | 475 | 450 | 700 | 725 | 445 | 290 | 595 |
| Tack, Monsanto Tel-Tak | | | | | | | | | | |
| Tack | 38 | 35 | 37 | 44 | 35 | 38 | 41 | 55 | 38 | 53 |
| Stickiness | 16 | 28 | 19 | 19 | 15 | 20 | 21 | 17 | 16 | 15 |
| "True" Tack | 22 | 7 | 18 | 25 | 21 | 18 | 20 | 38 | 22 | 38 |

The masterbatches are then further mixed with sulfur and accelerators, and the stocks are tested for stress-strain properties as shown in Table XII.

The data on the cured stocks 11–20 in Table XII show that, while the treatment of the invention slows cure times somewhat, it produces stocks having much higher 300% moduli. For example, Stocks 14, 16, 18, and 20 show a 300% modulus which is 54%, 44%, 77% and 80% higher, respectively, than Stocks 13, 15, 17 and 19. Thus the treatment has the added, unexpected advantage of greatly increasing the reinforcing effect of clay fillers.

EXAMPLE XII

Other non-black fillers are compared for the effect on rubber stocks of the treatment of the invention. In the same manner as Example II, various non-black fillers are incorporated into Natsyn 2200 masterbatches and tested for green strength and tack, as indicated in Table XIII. The following is an identification of the fillers:

| Designation | Type |
|---|---|
| Mistron Super Frost | Talc, 2 microns |
| Stanwhite 500 | Wet-ground CaCO₃, 5.3 microns |
| Hi-Sil 233 | Precipated Silica, 0.022 micron |

The NUCAP clays were also included as in Example XI.

The data in Table XIII show some increase in tack for the masterbatches treated according to the invention, and more increase in green strength. The improvements in each property were greater for the masterbatches containing the talc and silica than those containing calcium carbonate.

As in Example XI, the masterbatches are then completely compounded and tested for cured properties as shown in Table XIV.

Again, as in Example XI, the 300% moduli of the cured stocks which were treated according to the invention are higher than the untreated stocks by 65%, 99% and 71%, respectively.

TABLE XII

| | Stocks | | | | | | | | | |
|---|---|---|---|---|---|---|---|---|---|---|
| | 11 | 12 | 13 | 14 | 15 | 16 | 17 | 18 | 19 | 20 |
| Masterbatch | | | | | | | | | | |
| BB | 180.0 | — | — | — | — | — | — | — | — | — |
| BC | — | 180.0 | — | — | — | — | — | — | — | — |
| BD | — | — | 180.0 | — | — | — | — | — | — | — |
| BE | — | — | — | 182.0 | — | — | — | — | — | — |
| BF | — | — | — | — | 180.0 | — | — | — | — | — |
| BG | — | — | — | — | — | 182.0 | — | — | — | — |
| BH | — | — | — | — | — | — | 180.0 | — | — | — |
| BI | — | — | — | — | — | — | — | 182.0 | — | — |
| BJ | — | — | — | — | — | — | — | — | 180.0 | — |
| BK | — | — | — | — | — | — | — | — | — | 182.0 |
| Curatives | | | | | | | | | | |
| Sulfur | 2.5 | → | → | → | → | → | → | → | → | → |
| N—t-butyl-2-benzothiazyl Sulfenamide | 1.25 | → | → | → | → | → | → | → | → | → |
| Tetramethylthiuram disulfide | 0.30 | → | → | → | → | → | → | → | → | → |
| Cure Time, Minutes | 14 | 14 | 15 | 19 | 14 | 19 | 12 | 17 | 15 | 20 |
| Hardness, Shore A | 63 | 65 | 66 | 70 | 64 | 67 | 62 | 68 | 62 | 65 |
| Stress at Indicated Strain, MPa | | | | | | | | | | |
| 100% | 3.47 | 3.69 | 3.61 | 5.53 | 2.48 | 3.05 | 2.70 | 4.36 | 2.46 | 3.65 |
| 200% | 6.38 | 7.38 | 4.37 | 8.54 | 3.81 | 5.27 | 4.38 | 7.79 | 3.72 | 6.42 |
| 300% | 9.36 | 11.21 | 7.50 | 11.56 | 5.45 | 7.83 | 6.41 | 11.34 | 5.21 | 9.38 |
| Break Stress | 21.86 | 21.28 | 16.86 | 13.35 | 19.33 | 10.93 | 20.31 | 15.49 | 18.56 | 12.67 |
| Break Strain, % | 516 | 479 | 482 | 339 | 556 | 384 | 549 | 385 | 542 | 376 |

TABLE XIII

| | Masterbatch | | | | | | | |
|---|---|---|---|---|---|---|---|---|
| | BL | BM | BO | BP | BQ | BR | BS | BT |
| Polymer | | | | | | | | |
| Natsyn 2200 | 100.0 | → | → | → | → | → | → | → |
| Test Compound | | | | | | | | |
| N—Carbamoylmaleamic Acid | — | — | — | 1.70 | — | 1.70 | — | 1.70 |
| MBTS | — | — | — | 0.30 | — | 0.30 | — | 0.30 |
| Other Ingredients | | | | | | | | |
| NUCAP 100 | 72.0 | — | — | — | — | — | — | — |
| NUCAP 290 | — | 72.0 | — | — | — | — | — | — |
| Mistron Super Frost | — | — | 76.0 | 76.0 | — | — | — | — |
| Stanwhite 500 | — | — | — | — | 75.0 | 75.0 | — | — |
| Hi-Sil 233 | — | — | — | — | — | — | 56.0 | 56.0 |
| Zinc Oxide | 5.0 | → | → | → | → | → | → | → |
| Stearic Acid | 2.0 | → | → | → | → | → | → | → |
| Antioxidant | 1.0 | → | → | → | → | → | → | → |
| Triethanolamine | — | — | — | — | — | — | 1.0 | 1.0 |
| Green Strength @ Room Temp., MPa | | | | | | | | |
| Stress At: | | | | | | | | |
| 100% | 0.16 | 0.14 | 0.15 | 0.38 | 0.10 | 0.16 | 0.34 | 0.55 |
| 300% | 0.05 | 0.07 | 0.06 | 0.78 | 0.03 | 0.12 | 0.27 | 1.59 |
| 400% | — | 0.05 | 0.04 | 0.89 | 0.02 | 0.12 | 0.28 | 2.50 |
| U.E., % | 300 | 450 | 610 | 430 | 400 | >1200 | >1200 | 480 |
| Tack, Monsanto Tel-Tak | | | | | | | | |
| Tack | 39 | 37 | 36 | 48 | 37 | 43 | 54 | 81 |
| Stickiness | 17 | 17 | 21 | 14 | 14 | 17 | 17 | 16 |
| "True" Tack | 22 | 20 | 15 | 34 | 24 | 26 | 37 | 65 |

TABLE XIV

| | Stocks | | | | | | | |
|---|---|---|---|---|---|---|---|---|
| | 21 | 22 | 23 | 24 | 25 | 26 | 27 | 28 |
| Masterbatches | | | | | | | | |
| BL | 180.0 | | | | | | | |
| BM | — | 180.0 | | | | | | |
| BO | — | — | 184.0 | | | | | |
| BP | — | — | — | 186.0 | | | | |
| BQ | — | — | — | — | 183.0 | | | |
| BR | — | — | — | — | — | 185.0 | | |
| BS | — | — | — | — | — | — | 165.0 | |
| BT | — | — | — | — | — | — | — | 167.0 |
| Curatives | | | | | | | | |
| Sulfur | 2.50 | → | → | → | → | → | → | → |
| N—t-butyl-2-benzothiazyl Sulfenamide | 1.25 | → | → | → | → | → | → | → |
| Tetramethylthiuram Disulfide | 0.30 | → | → | → | → | → | → | → |
| Cure Time, Minutes | 18 | 20 | 20 | 20 | 20 | 20 | 10 | 12 |
| Hardness, Shore A | 62 | 66 | 69 | 72 | 62 | 63 | 65 | 71 |
| Stress at Indicated Strain, MPa | | | | | | | | |
| 100% | 3.30 | 3.51 | 3.92 | 6.57 | 1.62 | 2.59 | 1.49 | 2.37 |
| 200% | 6.01 | 6.97 | 5.34 | 9.29 | 2.14 | 4.23 | 2.62 | 4.52 |
| 300% | 8.60 | 10.49 | 7.18 | 11.87 | 3.08 | 6.12 | 4.27 | 7.32 |
| Break Stress | 18.97 | 18.20 | 21.05 | 19.11 | 11.96 | 9.65 | 25.48 | 25.73 |
| Break Strain, % | 509 | 456 | 535 | 439 | 502 | 394 | 739 | 644 |

EXAMPLE XIII

For further screening of compounds effective as component (A) of the composition of the invention, the following compounds are evaluated and compared with MBTS in combination with N-carbamoylmaleamic acid.

| Material | Identification |
|---|---|
| Morfax ® | 2-(morpholinodithio)benzothiazole |
| Vulcanizing Agent A | benzothiazole-C(=N)-SS-CH₂-C₆H₄-CH₂-SS-C(=N)-benzothiazole |
| Thiurad ® | tetramethylthiuram disulfide |
| Vulcanizing Agent B | [(CH₃)₂CHO]₂P(=S)—SS—CH₂—C₆H₄—CH₂SS—P(=S)[OH(CH₃)₂]₂ |
| Methyldithiopropionate | —(S—CH₂—CH₂—COOCH₃)₂ |
| Sulfasan ® R | dimorpholino disulfide |
| Santocure ® NS | N—t-butyl-2-benzothiazyl sulfenamide |
| Thiokol ® LP 32 | Organic Polysulfide, 4000 m.w. |

The compounds were incorporated into the rubber and masticated using the procedure of Example II.

Formulations and the results of green strength and tack testing are set forth in Table XV.

The data in Table XV show that all of the compounds used as component (A) of the composition are, to varying degrees, effective in improving the properties of synthetic polyisoprene. MBTS is clearly superior to the others in this experiment.

EXAMPLE XIV

In order to evaluate the effect of the treatment method on blends of natural rubber and SBR, a series of trials at 50/50 and 25/75 NR/SBR blend ratios is prepared. The treatment is performed as in Example II, and the combination of MBTS and N-carbamoylmaleamic acid is used, at several levels. The masterbatches and the green strength and tack test results are set forth in Table XVI.

The masterbatches are then fully compounded and the resultant stocks cured and tested, as shown in Table XVII. (It should be noted that the SBR rubbers contain oil, so that allowance must be made in the formulas for this.).

The data in Table XVI show that increasing amounts of the composition of the invention produce increasing green strength in the 50/50 NR/SBR blends and the 25/75 NR/SBR blends. Tack is increased in the 50/50 blends, but is essentially unimproved in the 25/75 blends.

The data in Table XVII show that increasing levels of the composition of the invention increase the 300% modulus of stocks made from both blends.

TABLE XV

|  | BU | BV | BW | BX | BY | BZ | CA | CB | CC | CD |
|---|---|---|---|---|---|---|---|---|---|---|
| Polymer | | | | | | | | | | |
| Natsyn 2200 | 100.0 | → | → | → | → | → | → | → | → | → |
| Test Compounds | | | | | | | | | | |
| N—Carbamoylmaleamic acid | — | 0.8 | → | → | → | → | → | → | → | → |
| MBTS | — | 0.2 | — | — | — | — | — | — | — | — |
| Morfax | — | — | 0.2 | — | — | — | — | — | — | — |
| Vulcanizing Agent A | — | — | — | 0.2 | — | — | — | — | — | — |
| Thiurad | — | — | — | — | 0.2 | — | — | — | — | — |
| Vulcanizing Agent B | — | — | — | — | — | 0.2 | — | — | — | — |
| Methyldithiopropionate | — | — | — | — | — | — | 0.2 | — | — | — |
| Sulfasan R | — | — | — | — | — | — | — | 0.2 | — | — |
| Santocure NS | — | — | — | — | — | — | — | — | 0.2 | — |
| Thiokol LP 32 | — | — | — | — | — | — | — | — | — | 0.2 |
| Other Ingredients | | | | | | | | | | |
| N-330 Carbon Black | 50.0 | → | → | → | → | → | → | → | → | → |
| Circosol 4240 Oil | 5.0 | → | → | → | → | → | → | → | → | → |
| Zinc Oxide | 5.0 | → | → | → | → | → | → | → | → | → |
| Stearic Acid | 2.0 | → | → | → | → | → | → | → | → | → |
| Antidegradant | 2.0 | → | → | → | → | → | → | → | → | → |
| Green Strength @ Room Temp., MPa Stress At: | | | | | | | | | | |
| 100% | 0.26 | 0.32 | 0.32 | 0.33 | 0.30 | 0.29 | 0.30 | 0.30 | 0.32 | 0.33 |
| 300% | 0.19 | 0.53 | 0.38 | 0.35 | 0.26 | 0.25 | 0.26 | 0.41 | 0.34 | 0.31 |
| 400% | 0.17 | 0.79 | 0.48 | 0.43 | 0.28 | 0.28 | 0.28 | 0.56 | 0.47 | 0.37 |
| U.E., % | >1200 | 540 | 720 | 740 | 1120 | 1140 | 980 | 610 | 680 | 810 |
| Tack, Monsanto Tel-Tak | | | | | | | | | | |
| Tack | 50 | 80 | 56 | 75 | 57 | 57 | 50 | 67 | 76 | 46 |
| Stickiness | 17 | 20 | 19 | 16 | 23 | 17 | 16 | 19 | 19 | 18 |
| "True" Tack | 33 | 70 | 37 | 59 | 34 | 40 | 34 | 48 | 57 | 28 |

TABLE XVI

| | Masterbatch | | | | | | | | |
|---|---|---|---|---|---|---|---|---|---|
|  | CE | CF | CG | CH | CI | CJ | CK | CL | CM |
| Polymer | | | | | | | | | |
| NR(SMR 5-CV) | 50.0 | → | → | → | → | 25.0 | → | → | → |
| SBR 1778 | 36.0 | → | → | → | → | 54.0 | → | → | → |
| SBR 1502 | 24.0 | → | → | → | → | 36.0 | → | → | → |
| Test Compounds | | | | | | | | | |
| NITROL + Clay | — | 0.75 | — | — | — | — | 0.75 | — | — |
| N—Carbamoylmaleamic Acid | — | — | 0.85 | 1.27 | 1.70 | — | — | 0.85 | 1.70 |
| MBTS | — | — | 0.15 | 0.23 | 0.30 | — | — | 0.15 | 0.30 |
| Other Ingredients | | | | | | | | | |
| N-660 Carbon Black | 70.0 | → | → | → | → | → | → | → | → |
| Zinc Oxide | 3.0 | → | → | → | → | → | → | → | → |
| Stearic Acid | 1.0 | → | → | → | → | → | → | → | → |
| Antioxidant | 1.0 | → | → | → | → | → | → | → | → |
| Green Strength @ Room Temp., MPa Stress At: | | | | | | | | | |
| 100% | 0.42 | 0.54 | 0.53 | 0.63 | 0.79 | 0.42 | 0.49 | 0.51 | 0.83 |
| 300% | 0.34 | 1.31 | 0.88 | 1.60 | 2.38 | 0.29 | 0.68 | 0.60 | 1.71 |
| 400% | 0.34 | 1.77 | 1.06 | 2.08 | 3.10 | 0.24 | 0.76 | 0.59 | 1.79 |
| U.E., % | 1020 | 460 | 650 | 490 | 420 | 450 | 780 | 550 | 440 |
| Tack, Monsanto Tel-Tak | | | | | | | | | |
| Tack | 64 | 53 | 72 | 72 | 62 | 33 | 22 | 36 | 31 |
| Stickiness | 11 | 14 | 12 | 15 | 14 | 12 | 13 | 14 | 14 |
| "True" Tack | 53 | 39 | 60 | 57 | 48 | 21 | 9 | 22 | 17 |

TABLE XVII

| | Stocks | | | | | | | | |
|---|---|---|---|---|---|---|---|---|---|
|  | 29 | 30 | 31 | 32 | 33 | 34 | 35 | 36 | 37 |
| Masterbatch | | | | | | | | | |
| CE | 185.0 | — | — | — | — | — | — | — | — |
| CF | — | 185.75 | — | — | — | — | — | — | — |
| CG | — | — | 186.0 | — | — | — | — | — | — |
| CH | — | — | — | 187.0 | — | — | — | — | — |
| CI | — | — | — | — | 188.0 | — | — | — | — |
| CJ | — | — | — | — | — | 190.0 | — | — | — |
| CK | — | — | — | — | — | — | 190.75 | — | — |
| CL | — | — | — | — | — | — | — | 191.0 | — |
| CM | — | — | — | — | — | — | — | — | 190.3 |
| Curatives | | | | | | | | | |
| Sulfur | 2.0 | → | → | → | → | → | → | → | → |

TABLE XVII-continued

| | Stocks | | | | | | | | |
|---|---|---|---|---|---|---|---|---|---|
| | 29 | 30 | 31 | 32 | 33 | 34 | 35 | 36 | 37 |
| MBTS | 0.8 | → | → | → | → | → | → | → | → |
| N—t-butyl-2-benzothiazyl sulfenamide | 0.5 | → | → | → | → | → | → | → | → |
| Cure Time, Min. @ 153° C. | 35 | 25 | 40 | 45 | 45 | 60 | 40 | 60 | 60 |
| Shore A Hardness | 68 | 67 | 68 | 70 | 70 | 68 | 70 | 68 | 71 |
| Stress-Strain Properties | | | | | | | | | |
| Stress at Indicated Strain, MPa | | | | | | | | | |
| 100% | 3.42 | 3.79 | 3.85 | 4.09 | 4.10 | 3.12 | 3.38 | 3.48 | 4.00 |
| 200% | 9.29 | 10.51 | 10.43 | 10.99 | 11.11 | 8.27 | 9.42 | 9.69 | 10.62 |
| 300% | 15.34 | 17.13 | 16.62 | 17.40 | 17.94 | 13.92 | 15.85 | 15.67 | 17.33 |
| Break Stress | 20.75 | 20.24 | 20.22 | 20.28 | 18.73 | 18.63 | 19.65 | 20.29 | 20.13 |
| Break Strain, % | 425 | 358 | 377 | 347 | 313 | 414 | 384 | 400 | 352 |

To evaluate the effectiveness of mercaptans as component (A) a series of compounds is prepared containing 2-mercaptobenzothiazole and thiophenol compared with MBTS as component (A). The rubber compounds, based on synthetic polyisoprene, are prepared and tested as before, using N-carbamoyl maleamic acid as component (B).

Formulations and results are set forth in Table XVIII. The data show that the mercaptans are effective as component (A).

TABLE XVIII

| | MASTERBATCH | | | | |
|---|---|---|---|---|---|
| | CN | CO | CP | CQ | CR |
| Polymer | | | | | |
| Natsyn 2200 | 100.0 | → | → | → | → |
| Test Compounds | | | | | |
| N—Carbamoyl maleamic acid | — | 1.0 | 0.85 | → | → |
| MBTS | — | — | 0.15 | — | — |
| 2-Mercaptobenzothiazole | — | — | — | 0.15 | — |
| Thiophenol | — | — | — | — | 0.15 |
| Other Ingredients | | | | | |
| N-330 Carbon Black | 50.0 | → | → | → | → |
| Circosol 4240 Oil | 5.0 | → | → | → | → |
| Zinc Oxide | 5.0 | → | → | → | → |
| Stearic Acid | 2.0 | → | → | → | → |
| Antidegradant | 2.0 | → | → | → | → |
| Green Strength @ Room Temp., MPa Stress At: | | | | | |
| 100% | 0.30 | 0.38 | 0.36 | 0.34 | 0.28 |
| 300% | 0.23 | 0.37 | 0.43 | 0.42 | 0.38 |
| 400% | 0.21 | 0.47 | 0.58 | 0.58 | 0.53 |
| U.E., % | >1200 | 690 | 600 | 590 | 610 |
| Tack, Monsanto Tel-Tak | | | | | |
| Tack | 53 | 71 | 57 | 52 | 46 |
| Stickiness | 23 | 18 | 19 | 19 | 22 |
| "True" Tack | 31 | 54 | 38 | 34 | 24 |

The diene rubber of the invention has been shown to possess improved properties, especially improved green strength and tack. As a result of these improved properties, processing of the diene rubber is facilitated, and rubber objects such as tires, for example, which are fabricated from a plurality of components can be produced with greater speed and with fewer defects. The improved diene rubber of the invention thus is useful for hose, belts, and a variety of other rubber products in addition to tires.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A composition comprising diene rubber treated, in the presence of a modification promoting amount of (A) sulfur or an organic sulfur compound capable of generating thiyl radicals, by (B) a compound of the formula

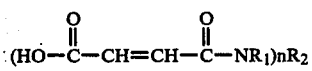

n being an integer of 1–3, wherein $R_1$ is hydrogen or alkyl of 1–10 carbon atoms and, if n=1, $R_2$ is selected from hydrogen,
alkyl of 1–10 carbon atoms, optionally forming a heterocyclic moiety with the N atom of the formula and $R_1$, either with or without an added N or O atom,

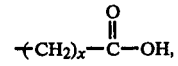

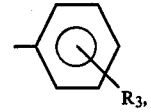

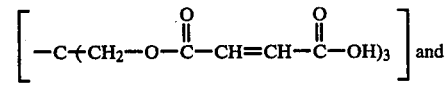 and

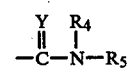

wherein Y is an oxygen or sulfur atom, x is an integer of 1–12, $R_3$ is:
hydrogen, —COOH,
alkoxy of 1–5 carbon atoms or

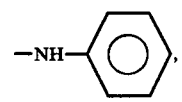

$R_4$ and $R_5$ are the same or different selected from:
hydrogen,
phenyl and
alkyl of 1–10 carbon atoms;

if n=2, R₂ is selected from phenylene, divalent aliphatic hydrocarbon radicals of 2-20 carbon atoms and

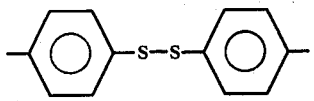

and if n=3, R₂ is s-triazinyl or a trivalent aliphatic hydrocarbon of 2-20 carbon atoms, said composition having been treated at a temperature of from 160° to 210° C. for a long enough time to impart to the compositin improved green strength, tack or non-black filler interaction capability.

2. The composition of claim 1 wherein the treatment time is from 0.1 to 20 minutes and (A) and (B) are present in amounts of from 0.01-15 and 0.1-20 parts by weight, respectively, per 100 parts diene rubber by weight.

3. The composition of claim 2 wherein the time is from 0.5 to 15 minutes and (A) and (B) are present in amounts of from 0.02-4 and 0.2-8 parts by weight, respectively, per 100 parts diene rubber by weight.

4. The composition of claim 3 wherein the time is from 1-10 minutes and (A) and (B) are present in amounts of from 0.05-2.5 and 0.25-5 parts by weight, respectively, per 100 parts diene rubber by weight.

5. The composition of claim 2 wherein the diene rubber comprises polyisoprene.

6. The composition of claim 5 wherein (A) is sulfur.

7. The composition of claim 5 wherein (A) is an organic sulfur compound capable of generating thiyl radicals.

8. The composition of claim 7 wherein (A) is selected from polymeric polysulfides and compounds of the formula (R₆S_z)_yR₇, wherein z is an integer of 1-5, y is an integer of from 1-4, R₇ is selected from aliphatic hydrocarbon radicals of 3-18 carbon atoms optionally containing one or more ether or ester linkages and optionally substituted by one or more nitro, amino or carboxyl groups; cycloalkyl of 3-10 carbon atoms; benzyl or phenyl optionally ring-substituted by one or more nitro, amino, carboxyl, or 1-5 carbon-atom alkyl groups; or benzothiazyl, dialkylthiocarbamoyl; alkylamino of 4-12 carbon atoms; morpholino; or dialkylthiophosphoroyl; R₇ having a valence of y; and R₆ is hydrogen or a radical selected from the same group as R₇.

9. The composition of claim 8 where (A) is 2,2'-dithiobisbenzothiazole.

10. The composition of claim 8 wherein (A) is a phenyl mercaptan.

11. The composition of claim 8 wherein (A) is 2-mercaptobenzothiazole.

12. The composition of claim 7 wherein n is one, R₁ is hydrogen and R₂ is

13. The composition of claim 12 wherein Y is oxygen.

14. The composition of claim 2 wherein the diene rubber comprises polyisoprene, (A) is 2,2'-dithiobisbenzothiazole, n is one, R₁ is hydrogen and R₂ is

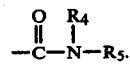

15. The composition of claim 14 wherein the polyisoprene comprises natural rubber.

16. The composition of claim 14 wherein the diene rubber includes polybutadiene or styrene-butadiene rubber.

17. The composition of claim 4 wherein the diene rubber comprises polyisoprene and (A) is 2,2'-dithiobisbenzothiazole.

18. The composition of claim 17 wherein (B) is maleamic acid.

19. The composition of claim 17 wherein n is one, R₁ is hydrogen and R₂ is

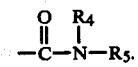

20. The composition of claim 17 wherein (B) is N-carbamoyl maleamic acid.

21. The composition of claim 17 wherein (B) is N-carboxymethyl maleamic acid.

22. The composition of claim 17 wherein (B) is N-carboxyphenyl maleamic acid.

23. The composition of claim 17 wherein (B) is N,N'-(4,4'-dithiophenyl)bismaleamic acid.

24. The composition of claim 20 wherein carbon black is present during the treatment.

25. The composition of claim 20 wherein the polyisoprene comprises natural rubber.

26. The composition of claim 20 wherein the diene rubber includes polybutadiene or styrene-butadiene rubber.

27. The composition of claim 20 wherein a non-black filler is present during the treatment.

28. The composition of claim 27 wherein the filler is clay, talc, calcium carbonate or silica.

29. The composition of claim 4 wherein the treatment comprises mastication.

30. The composition of claim 4 additionally incorporating from 10 to 1,000 parts by weight of diene rubber not present during the treatment.

31. Vulcanized composition of claim 4.

32. A method of treating diene rubber comprising treating the rubber, in the presence of a modification promoting amount of (A) sulfur or an organic sulfur compound capable of generating thiyl radicals, with (B) a compound of the formula:

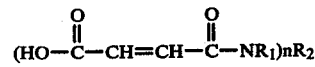

n being an integer of 1-3, wherein R₁ is hydrogen or alkyl of 1-10 carbon atoms and, if n=1, R₂ is selected from
hydrogen,
alkyl of 1-10 carbon atoms, optionally forming a heterocyclic moiety with the N atom of the formula and R₁, either with or without an added N or O atom,

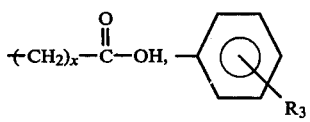

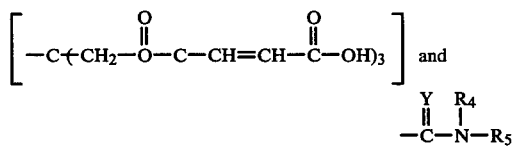

wherein Y is an oxygen or sulfur atom, x is an integer of 1-12, R₃ is:
hydrogen, —COOH,
alkoxy of 1-5 carbon atoms or

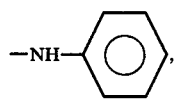

$R_4$ and $R_5$ are the same or different selected from:
hydrogen,
phenyl and
alkyl of 1-10 carbon atoms, including cycloalkyl of from 3 to 10 carbon atoms;
if n=2, $R_2$ is selected from phenylene, divalent aliphatic hydrocarbon radicals of 2-20 carbon atoms and

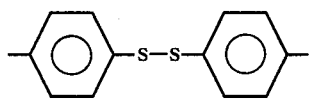

and if n=3, $R_2$ is s-triazinyl or a trivalent aliphatic hydrocarbon of 2-20 carbon atoms, at a temperature of from 160° to 210° for sufficient time to impart to the composition improved green strength, tack or non-black filler interaction capability.

33. The method of claim 32 wherein the treatment time is from 0.1 to 20 minutes and (A) and (B) are present in amounts of from 0.01-15 and 0.1-20 parts by weight, respectively, per 100 parts diene rubber by weight.

34. The method of claim 33 wherein the time is from 0.5 to 15 minutes and (A) and (B) are present in amounts of from 0.02-4 and 0.2-8 parts by weight, respectively, per 100 parts diene rubber by weight.

35. The method of claim 34 wherein the time is from 1-10 minutes and (A) and (B) are present in amounts of from 0.05-2.5 and 0.25-5 parts by weight, respectively, per 100 parts diene rubber by weight.

36. The method of claim 33 wherein the diene rubber comprises polyisoprene.

37. The method of claim 36 wherein (A) is sulfur.

38. The method of claim 33 wherein (A) is an organic sulfur compound capable of generating thiyl radicals.

39. The method of claim 38 wherein (A) is selected from polymeric polysulfides and compounds of the formula $(R_6S_z)_yR_7$, wherein z is an integer of 1-5, y is an integer of from 1-4, $R_7$ is selected from aliphatic hydrocarbon radicals of 3—18 carbon atoms optionally containing one or more ether or ester linkages and optionally substituted by one or more nitro, amino or carboxyl groups; cycloalkyl of 3-10 carbon atoms; benzyl or phenyl optionally ring-substituted by one or more nitro, amino, carboxyl, or 1-5 carbon-atom alkyl groups; or benzothiazyl; dialkylthiocarbamoyl; alkylamino of 4-12 carbon atoms; morpholino; or dialkylthiophosphoroyl; $R_7$ having a valence of y; and $R_6$ is hydrogen or a radical selected from the same group as $R_7$.

40. The method of claim 38 wherein (A) is 2,2'-dithiobisbenzothiazole.

41. The method of claim 38 wherein (A) is a phenyl mercaptan.

42. The method of claim 38 wherein (A) is 2-mercaptobenzothiazole.

43. The method of claim 40 wherein n is one, $R_1$ is hydrogen and $R_2$ is

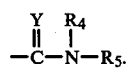

44. The method of claim 43 wherein Y is oxygen.

45. The method of claim 34 wherein the diene rubber comprises polyisoprene, (A) is 2,2'-dithiobisbenzothiazole, n is one, $R_1$ is hydrogen and $R_2$ is

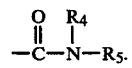

46. The method of claim 45 wherein the polyisoprene comprises natural rubber.

47. The method of claim 45 wherein the diene rubber includes polybutadiene or styrene-butadiene rubber.

48. The method of claim 35 wherein the diene rubber comprises polyisoprene and (A) is 2,2'-dithiobisbenzothiazole.

49. The method of claim 48 wherein (B) is maleamic acid.

50. The method of claim 48 wherein n is one, R is hydrogen and $R_2$ is

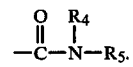

51. The method of claim 50 wherein (B) is N-carbamoyl maleamic acid.

52. The method of claim 48 wherein (B) is N-carboxymethyl maleamic acid.

53. The method of claim 48 wherein (B) is N-carboxyphenyl maleamic acid.

54. The method of claim 48 wherein (B) is N,N'-(4,4'-dithiophenyl)bismaleamic acid.

55. The method of claim 51 wherein carbon black is present during the treatment.

56. The method of claim 55 wherein the polyisoprene comprises natural rubber.

57. The method of claim 55 wherein the diene rubber includes polybutadiene or styrene-butadiene rubber.

58. The method of claim 51 wherein a non-black filler is present during the treatment.

59. The method of claim 58 wherein the filler is clay, talc, calcium carbonate or silica.

60. The method of claim 35 wherein the treatment comprises mastication.

61. The method of claim 35 additionally incorporating from 10 to 1,000 parts by weight of diene rubber not present during the treatment.

62. The method of claim 35 and the additional step of vulcanizing the diene rubber.

* * * * *